United States Patent Office 2,761,596
Patented Sept. 4, 1956

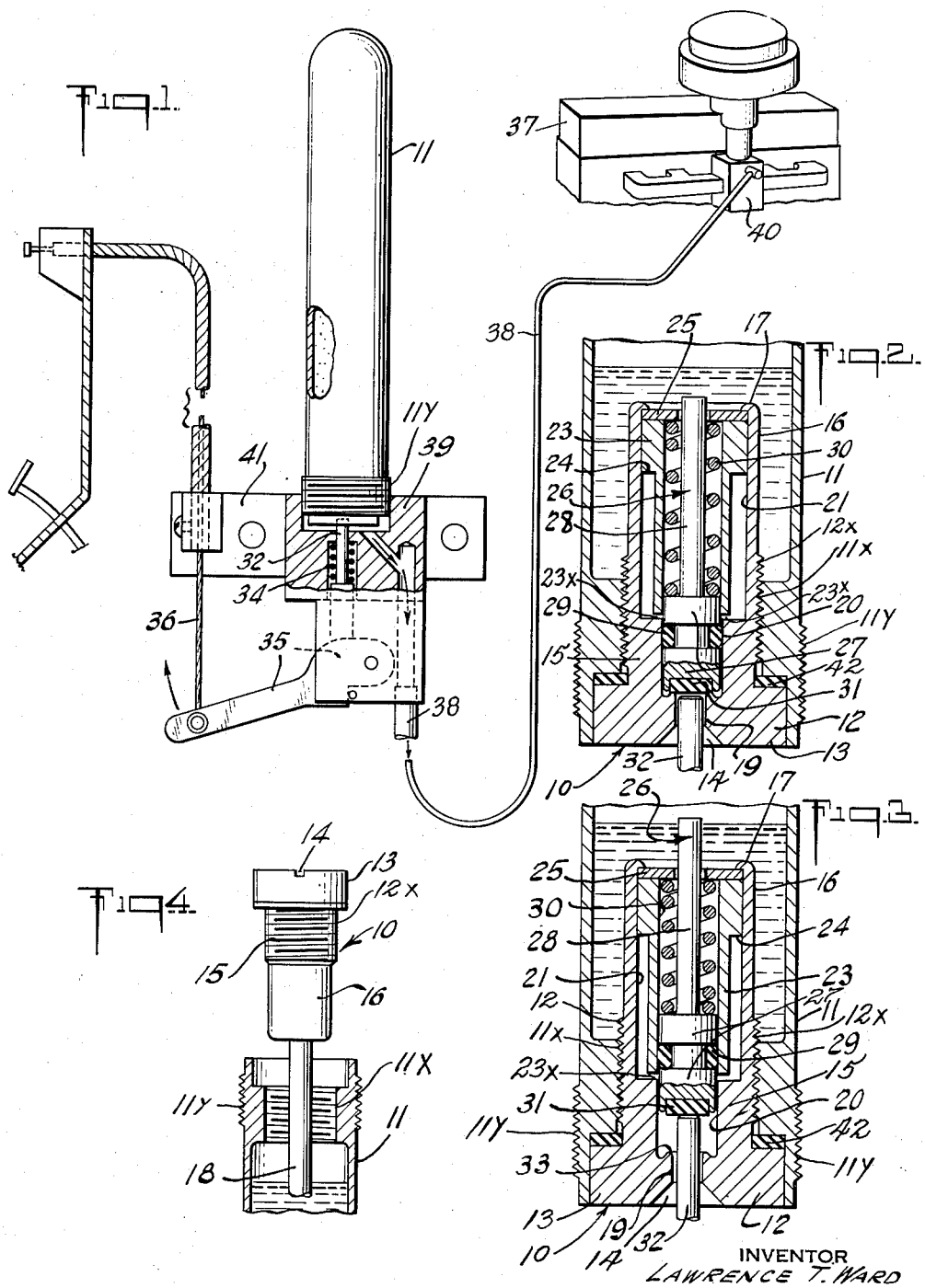

2,761,596
PROPANE PRIMER VALVE

Lawrence T. Ward, Portland, Pa.

Application August 16, 1954, Serial No. 450,178

5 Claims. (Cl. 222—444)

This invention relates to a primer for injecting propane into the manifold of an engine to facilitate cold weather starting and more particularly to a primer valve adapted to dispense a measured or metered amount of liquid propane.

It is common knowledge that winter starting-up of a gasoline engine using commonly available gasoline is a difficult process. This is especially so where the temperatures are extremely cold as in Alaska.

It is an object of this invention to provide a propane primer spray valve adapted to inject a metered or definite amount of liquid propane into an internal combustion engine to facilitate starting even under the most adversely cold conditions.

It is another object of this invention to provide a device adapted to receive easily handled cartridges of propane.

It is another object of this invention to provide a cartridge adapted to hold high pressure low boiling liquid fuels and having a valve assembly therein adapted to dispense a metered amount of said liquid fuel such as propane or like combustible fuels.

It is a further object of this invention to provide an inexpensive device of simple construction employing inexpensive non-refillable propane cartridges having a metering valve therein.

These and other purposes and advantages of this invention will become apparent to those skilled in the art upon reading the disclosure in conjunction with the drawing in which:

Fig. 1 is a perspective view of an automobile engine with a side view partly in section of the propane primer showing the manner of operating the mechanism and showing a conduit for transporting the vaporized propane to the manifold of an engine.

Fig. 2 is a vertical section through a metering valve disposed in a cartridge container and showing the manner of filling the metering reservoir.

Fig. 3 is a section similar to Fig. 1 but showing the manner of discharging the reservoir contents and, Fig. 4 is a view of a modified valve cartridge usable in an upright position and having a syphon tube leading from the liquid mass into the valve body.

The valve of this invention is a metering valve 10 (Fig. 4) having exterior threads 12X adapted to be threadingly secured into a high pressure resistant cartridge container 11 having internal threads 11X adapted to receive said threads 12X of valve 10. The container 11 is provided with exterior threads 11Y for engaging a threaded cavity in a container holding block 39.

The valve consists of a tubular housing 12 having a flanged head 13 having a slot 14 therein to receive a screw driver, a threaded neck 15 to engage the internal threads 11X of container 11 and a stub portion 16 having a turned in rim 17 (Figs. 2 and 3).

In the preferred use of the valve of this invention (Figs. 1-3) the cartridge mouth is disposed downward thereby permitting liquid propane to flood the entire stub 16. In the use of the cartridge with the cartridge mouth uppermost the valve is provided with a dip or syphon tube 18 (Fig. 4) which dips into the liquid and conveys the liquid in the tube into the valve body.

Turning to Figs. 2 and 3, the valve housing 12 is provided with a tubular throat 19 of small diameter which communicates with a first housing well cavity 20 of larger diameter, and this well 20 communicates with a second cavity 21 of still larger diameter.

A tubular pillar 23 having a shoulder 24 is secured in well cavity 21 and disposed against a washer ring 25 seated on rim 17. A plunger 26 having a grooved head 27 and a rod 28 integral therewith is provided with a sealer ring 29 of resilient rubber or plastic in the groove of said head. The diameter of the moveable plunger head 27 is slightly less than the diameter of the conduit of pillar 16 and of well 20 to permit passage selectively of propane therebetween.

The rod 28 extends loosely through the aperture in washer ring 25 to permit passage of propane. A coil spring 30 is disposed about rod 28 and between ring 25 and plunger head 27, thereby constantly urging the plunger 26 toward the housing throat 19.

The plunger head 27 is provided with a recess to receive a cushion disc 31. A force rod 32 (Figs. 1–3) is disposed loosely in throat 19 and adapted to seat upon disc 31 and to be forced inwardly against the action of spring 30.

In the charging of the reservoir chamber formed between the well cavity wall 21 and the external wall of pillar 23 (Fig. 2) i. e. an annular cylinder having the thickness of ledge 24, the propane under pressure in cartridge 11 is forced through the aperture of washer ring 25 and between head 27 and the corresponding surface of the tubular conduit of pillar 23 and thence into the reservoir. The reservoir contents are prevented from passing into throat 19 because of the presence of sealer ring 29 therebetween and because of the seating of disc 31 upon an elevated ridge 33 (Fig. 3) disposed about throat 19.

In the operation of the valve (Fig. 3), the force rod 32 forces in plunger 26, thereby compressing coil spring 30 and moving plunger head 27 into the tube of pillar 23 until sealer ring 29 passes the clearance space 23X (or slots in pillar 23) disposed between the pillar 23 and housing 12, thereby permitting the contents of the reservoir to pass outwardly through this clearance space 23X (or slots in the pillar edge) and thence into and through throat 19.

Referring now to Fig. 1, the force-rod 32 is spring loaded in a direction away from throat 19 by a coil spring 34. The rod is frictionally floated on the edge of a cam plate 35 so that upward movement of the cam plate causes upward movement of the force rod 32 against valve plunger 26. This upward movement of the cam plate may be effected from inside the automobile by means of a conventional flexible wire 36 leading from the cam plate to the dash board of the automobile.

A pull on wire 36 in the automobile causes a single burst of propane vapor or gas to be injected into the automobile engine 37 through conduit 38 leading from holding block 39 to the manifold 40 of the engine. The block 39 may be secured to any convenient support underneath the automobile hood by means of a bracket 41.

The propane cartridge is preferably used with the valve disposed downwardly as in Figs. 1 to 3 since the feed of liquid propane is positive or certain in this instance. However, the cartridge may be used in an upright manner (Fig. 4) if it is provided with a dip tube 18 disposed in the propane liquid, said tube being provided with a flared end (not shown) to seat on rim 17 of the housing. The disadvantage of an upright tube is that the liquid stream may be broken and gaseous fuel will then fill the top of the dip tube causing a vapor-lock. This is not too serious a condition since a few pulls of the handle flexible wire 26 will cause the gas to escape and permit the reservoir to be filled with liquid again. Clearly, the operation of the flooded valve as shown in Figs. 1 to 3 is most desirable.

The cartridge 11 may be of the throw away type and preferably is capable of about 80 to 100 discrete fillings and discharge of the valve reservoir in valve housing 12.

In the insertion of the valve assembly into the container 11 a gasket ring 42 is used to effect a gas-tight seal between housing 12 and the container 11.

Having read this disclosure, those skilled in the art will now become aware of obvious changes, but all these changes are intended to be embraced within the claims appearing herein.

The throat 19 and the two well cavities 20 and 21 constitute the tube of the tubular housing so that in effect this tube consists of three cylindrical well cavities or tube sections of diminishing diameter. Also the inlet-outlet aperture of the reservoir may be formed by cutting grooves (not shown) in the top edge of pillar 23.

I claim:

1. A valve device adapted to dispense a measured or definite quantity of liquid comprising a valve housing having a tubular conduit therethrough, said conduit consisting of three tube sections having successively increasing diameters relative to the top surface of the valve housing, a tubular pillar secured in the largest tube section and having an exterior recessed wall adapted to form a reservoir produced by the annular space formed by said recessed wall and the interior wall of the housing surrounding said recessed wall, said reservoir having common inlet-outlet passage means disposed between said pillar and said housing, a plunger having a rod section and a cylindrical grooved head adapted to loosely fit into said pillar, said head being provided with an annular sealer ring in the groove thereof adapted to close or open said inlet-outlet passage means, spring means disposed co-actingly upon said plunger for constantly urging said sealer ring outwardly to normally permit continuous communication of the reservoir liquid with a body of liquid disposed about said plunger, an apertured disc secured upon said spring means and between said pillar and said housing with the plunger rod loosely disposed in the aperture therein to permit passage of fluid through said aperture and container means removably secured to and surrounding said housing for storage of liquid to be dispensed by said valve.

2. A propane primer assembly for dispensing a metered quantity of liquid propane comprising a cartridge container for storage of dispensable liquid propane adapted to be threadingly secured to a support block, and a metering spray valve device threadingly secured in the mouth of said container in a gas tight manner, said valve device consisting of a tubular valve housing the tube of which consists of a plurality of three contiguous well cavities, one of which is an outlet port, of successively increasing diameter in a direction away from said valve outlet port, said outlet port being adapted to receive a valve activating force rod; a plunger having a cylindrical grooved head section and a rod section with the head section loosely disposed in the second well cavity to permit passage of liquid therebetween, said head section being provided centrally of the cylinder in the groove thereof with a sealer ring to engage the second wall cavity in gas tight relationship; a tubular pillar element disposed in the third valve housing cavity, the tube of said pillar element being of a diameter equal to that of the second housing cavity and linearly disposed thereto, said pillar element being provided with a recessed outer wall to form a reservoir chamber with the wall of the housing of the largest valve housing cavity and with circularly disposed inlet-outlet aperture passage between the lip of said pillar and said housing adapted to be alternately opened and closed by reciprocal movement of the plunger head sealer ring thereover, spring means disposed about said plunger rod for urging said piston head constantly toward said housing port cavity, and apertured washer means disposed loosely about said rod and upon said spring means between said pillar and said housing for securing said pillar and said plunger in said housing and permitting passage of fluid through said washer aperture.

3. A metering spray valve consisting of a tubular valve housing the tube of which consists of a plurality of three well cavities, one of which is an outlet port, of successively increasing diameter in a direction away from said valve outlet port, said outlet port being adapted to receive a valve activating force rod; a plunger having a cylindrical grooved head section and a rod section with the head section loosely disposed in the second well cavity to permit passage of liquid therebetween said head section being provided centrally of the cylinder in the groove thereof, with a sealer ring to engage the second wall cavity in gas tight relationship; a tubular pillar element disposed in the third housing cavity, the tube of said pillar element being of a diameter equal to that of the second housing cavity and linearly disposed thereto, said pillar element being provided with a recessed outer wall to form a reservoir chamber with the wall of the largest valve housing cavity and with circularly disposed inlet-outlet aperture passage between the lip of said pillar and said housing and adapted to be alternately opened and closed by reciprocal movement of the plunger head sealer ring thereover, spring means disposed upon said plunger for urging said piston head constantly toward said housing port cavity, and an apertured washer disposed loosely around said plunger and upon said spring means for securing said pillar and said plunger in said valve housing and permitting fluid passage through said aperture of said washer.

4. The spray valve of claim 3 having an elevated ridge inwardly of the port cavity of said valve housing and having a cushion disc in the top of the head section adapted to engage said ridge of said housing in gas tight relationship.

5. The spray valve of claim 4 wherein the means for securing the pillar in said housing is a washer ring secured in place by turned-over edge of the valve housing, said washer aperture permitting passage of liquid propane from a reservoir in a container secured externally to and around said housing.

References Cited in the file of this patent

UNITED STATES PATENTS

| 597,292 | Lindner et al. | Jan. 11, 1898 |
| 1,085,404 | Corey | Jan. 27, 1914 |
| 1,526,001 | La Rue | Feb. 10, 1925 |
| 1,746,727 | Dunlap | Feb. 11, 1930 |
| 1,866,237 | Thompson et al. | July 5, 1932 |
| 2,623,785 | Henchert | Dec. 30, 1952 |